(12) United States Patent
Parrilla Calle et al.

(10) Patent No.: US 11,008,106 B2
(45) Date of Patent: May 18, 2021

(54) SEAT DEVICE, PARTICULARLY AIRCRAFT SEAT DEVICE

(71) Applicant: RECARO Aircraft Seating GmbH & Co. KG, Schwaebisch Hall (DE)

(72) Inventors: Javier Parrilla Calle, Stuttgart (DE); Jens Jakubowski, Schwaebisch Gmuend (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 0 days.

(21) Appl. No.: 16/500,219

(22) PCT Filed: Apr. 3, 2018

(86) PCT No.: PCT/EP2018/058513
§ 371 (c)(1),
(2) Date: Oct. 2, 2019

(87) PCT Pub. No.: WO2018/185114
PCT Pub. Date: Oct. 11, 2018

(65) Prior Publication Data
US 2020/0346758 A1    Nov. 5, 2020

(30) Foreign Application Priority Data

Apr. 3, 2017   (DE) .................. 10 2017 107 153.9

(51) Int. Cl.
*B64D 11/06*   (2006.01)
*B60N 2/856*   (2018.01)
(Continued)

(52) U.S. Cl.
CPC .......... *B64D 11/0642* (2014.12); *B60N 2/841* (2018.02); *B60N 2/856* (2018.02);
(Continued)

(58) Field of Classification Search
CPC .................. B64D 11/0642; B64D 11/0619; B60N 2/856; B60N 2/841; B60N 2/888; B60N 2/885; B60N 2/838
(Continued)

(56) References Cited

U.S. PATENT DOCUMENTS 2,917,109 A * 12/1959 Marsh .................. A47C 7/38
297/114
5,370,446 A   12/1994 Bancod
(Continued)

FOREIGN PATENT DOCUMENTS

CN   201338546 Y   11/2009
DE   3039934 A1    5/1982
(Continued)

OTHER PUBLICATIONS

Search Report dated Feb. 9, 2018 issued in corresponding DE patent application No. 10 2017 107 153.9 (and partial English translation).
(Continued)

*Primary Examiner* — Milton Nelson, Jr.
(74) *Attorney, Agent, or Firm* — Posz Law Group, PLC

(57) ABSTRACT

A seat device, particularly aircraft seat device, includes at least one head-support module, which device has a central cushion unit and at least one lateral cushion unit, wherein the lateral cushion unit is supported movably relative to the central cushion unit.

17 Claims, 7 Drawing Sheets

Figure 1:
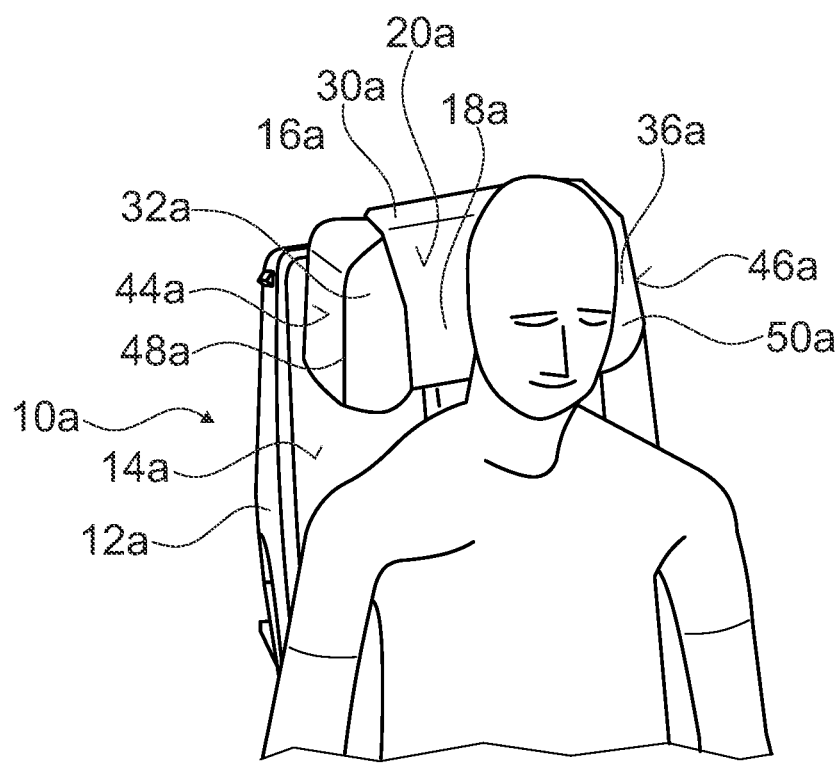

(51) Int. Cl.
*B60N 2/841* (2018.01)
*B60N 2/885* (2018.01)
*B60N 2/888* (2018.01)

(52) U.S. Cl.
CPC ............. *B60N 2/885* (2018.02); *B60N 2/888* (2018.02); *B64D 11/0619* (2014.12)

(58) Field of Classification Search
USPC ............................. 297/406, 408, 216.12, 407
See application file for complete search history.

(56) References Cited

U.S. PATENT DOCUMENTS

| | | | |
|---|---|---|---|
| 5,904,405 A | 5/1999 | Wu | |
| 7,364,239 B2 * | 4/2008 | Clough | ................... A47C 7/38 |
| | | | 297/391 |
| 2012/0139309 A1 | 6/2012 | Gaither et al. | |
| 2015/0145307 A1 | 5/2015 | Arcola et al. | |

FOREIGN PATENT DOCUMENTS

| | | | | |
|---|---|---|---|---|
| DE | 8810569 U1 | 12/1988 | | |
| DE | 3829470 C1 | 10/1989 | | |
| DE | 19724764 C1 | 10/1998 | | |
| DE | 10241132 A1 | 3/2004 | | |
| DE | 102013001336 A1 | 7/2014 | | |
| EP | 0 4 70 051 A1 | 2/1992 | | |
| EP | 1142753 A1 | 10/2001 | | |
| JP | 2016147569 A | * | 8/2016 | ............. B60N 2/856 |
| WO | 2017 /118868 A1 | 7/2017 | | |

OTHER PUBLICATIONS

International Search Report dated Jun. 19, 2018 issued in corresponding International Patent Application No. PCT/EP2018/058513.
International Preliminary Report on Patentability dated Oct. 8, 2019 issued in corresponding International Patent Application No. PCT/EP2018/058513.

* cited by examiner

SEAT DEVICE, PARTICULARLY AIRCRAFT SEAT DEVICE

CROSS REFERENCE TO RELATED APPLICATIONS

This application is a U.S. national stage application of PCT/EP2018/058513 filed on Apr. 3, 2018, which is based on German Patent Application No. 10 2017 107 153.9 filed on Apr. 3, 2017, the contents of which are incorporated herein by reference.

PRIOR ART

The invention relates to a seat device, particularly an aircraft seat device, as claimed in the preamble of patent claim 1.

A seat device, particularly aircraft seat device, comprising at least one head-support module, which device has a central cushion unit and at least one lateral cushion unit, has already been proposed.

It is the object of the invention in particular to provide a device of the type in question having improved properties in respect of comfort. The object is achieved according to the invention by the features of patent claim 1 while advantageous refinements and developments of the invention can be gathered from the dependent claims.

Advantages of the Invention

The invention is based on a seat device, particularly an aircraft seat device, comprising at least one head-support module, which device has a central cushion unit and at least one lateral cushion unit.

It is proposed that the lateral cushion unit is supported movably relative to the central cushion unit. An "aircraft seat device" is intended to be understood here as meaning in particular a device which forms at least one part of an aircraft seat or an entire aircraft seat. An "aircraft seat" is intended to be understood here as meaning in particular a seat which is provided to be mounted on a cabin floor in an aircraft cabin of an aircraft and on which a passenger can sit during a flight. The aircraft seat here has at least one seat base and a backrest coupled to the seat base, wherein the backrest is preferably connected pivotably to the seat base, as a result of which the aircraft seat is preferably movable into different functional positions. A "head-support module" is intended to be understood here as meaning in particular a module which is provided at least in one state to provide at least one contact surface at least for supporting the back of a head, and/or at least one contact surface at least for supporting a neck region and/or at least one contact surface at least for supporting a lateral head region of a passenger. A "central cushion unit" is intended to be understood here as meaning in particular a unit of the head-support module, which unit in particular provides a contact surface at least for supporting the back of a head, wherein the contact surface which forms the central cushion unit here runs substantially parallel to a backrest surface. The central cushion unit here preferably has at least one carrier element and at least one comfort element at least partially surrounding the carrier element. The comfort element here is preferably formed from a foam material which is surrounded in particular by a protective cover during use. In principle, it is also conceivable for a further protective cover which can easily be exchanged, what is referred to as an antimacassar, to be attached in addition to the protective cover to the comfort element in particular in regions in which the passenger's head rests. The central cushion unit here forms in particular a central region of the head-support module and is thereby attached in a mounted state centrally to the backrest, preferably in the transverse direction. The head-support module is preferably connected to the backrest via the central cushion unit. The head-support module is preferably connected to the backrest so as to be adjustable at least in height. For this purpose, the head-support module is connected to the backrest via a linear bearing unit, wherein at least one bearing element of the linear bearing unit is arranged on a rear side of the central cushion unit, said rear side facing the backrest. In principle, it would also be conceivable for the central cushion unit to have a bearing element for connection to the backrest on the lower side thereof or on the upper side thereof. In principle, it is likewise conceivable for the head-support module to be connected rigidly in one position to the backrest. In principle, it would likewise be conceivable for the head-support module to adjoin an upper end of the backrest. An "at least one lateral cushion unit" is intended to be understood here as meaning in particular a unit of the cushion module, which unit is arranged on laterally on one side of the central cushion unit and forms at least the contact surface at least for supporting the neck region and/or at least the contact surface at least for supporting the lateral head region of a passenger. The lateral cushion unit preferably extends here from a region to the side of the central cushion unit as far as a region which is located in front of the central cushion unit, as seen in the sitting direction. The lateral cushion unit here forms the contact surface for the passenger to the side of the contact surface which forms the central cushion unit. "Movable relative to the central cushion unit" is intended to be understood here as meaning in particular rotatable with respect to a pivot axis and/or adjustable along a guide path relative to the central cushion unit. "Provided" is intended to be understood in particular as meaning specially designed and/or equipped. An object being provided for a certain function is intended to be understood as meaning in particular that the object carries out and/or executes said certain function in at least one use state and/or operating state. This can result in the provision of a particularly advantageous head support which is comfortable for a passenger and on which the passenger can support at least his/her head and/or his/her neck particularly comfortably.

Furthermore, it is proposed that the head-support module has at least one at least wire-like and/or wave-like bearing element, on which the lateral cushion unit is at least partially arranged. A "bearing element" is intended to be understood here as meaning in particular an element which forms at least one bearing point via which at least one element coupled to the bearing element, such as in particular at least the one lateral cushion unit, is mounted adjustably, preferably pivotably, with respect to a further element, such as in particular with respect to the central cushion unit. "Wire-like" is intended to be understood here as meaning in particular formed from a wire or a wire-like element, such as in particular from a bent rod. A wire-like element should be understood here as meaning preferably a dimensionally stable element, such as from a wire, preferably a round wire, or in particular a bent rod which, by means of different bends, has a defined shape. A "wave-like element" is intended to be understood here as meaning in particular an element which has at least one bearing point and is mounted rotatably. "Arranged at least partially on the bearing element" is intended to be understood here as meaning in particular that the bearing element is arranged at least with one part within the at least one lateral cushion unit and the latter is thereby coupled in particular fixedly to the bearing element. As a result, the at least one lateral cushion unit can be connected particularly advantageously to the central cushion unit.

Furthermore, it is proposed that the head-support module has at least one bearing element for a support of the at least one lateral cushion unit, which bearing element forms a pivot axis which runs substantially in a transverse direction of the central cushion unit. "Substantially in a transverse direction of the central cushion unit" is intended to be understood here as meaning in particular that the pivot axis runs from a first side surface as far as an opposite side surface of the central cushion unit, wherein the pivot axis is preferably oriented perpendicular to the two side surfaces here. The side surfaces should be understood here as meaning in particular the lateral surfaces of the central cushion unit on which the lateral cushion units are arranged. In a state mounted on the aircraft seat, the pivot axis is preferably oriented in a transverse direction of the aircraft seat, said transverse direction being orthogonal to a sitting direction of the aircraft seat. As a result, a particularly advantageous bearing element for the at least one lateral cushion unit can be provided.

Furthermore, it is proposed that a bearing element extends through the central cushion unit, and comprises a second lateral cushion unit which is likewise at least partially arranged on the bearing element on a side of the central cushion unit that is situated opposite the first lateral cushion unit. The two lateral cushion units are formed here by means of the bearing element so as to be pivotable with respect to the central cushion unit, wherein pivot axes of the two lateral cushion units preferably run coaxially with respect to each other, wherein it is in principle also conceivable for the pivot axes to run parallel to each other and/or to be pivoted slightly in relation to each other. In principle, it is also conceivable for the two lateral cushion units to be able to be pivoted independently of each other. As a result, the head-support module can be formed particularly advantageously and comfortably.

It is furthermore proposed that the at least one bearing element has at least one angular deflection in a vicinity of its bearing region. A "vicinity" is here in particular to be understood as a region which has less than 5 cm, preferably less than 2 cm and, in a particularly advantageous refinement, less than 1 cm from a reference point, in this connection from the bearing region. A "bearing region" is intended to be understood here as meaning in particular a region in which the bearing element is in direct contact with an element with respect to which said bearing element is mounted. The bearing element here is coupled in the bearing region to the other element preferably via a plain bearing. An "angular deflection" is intended to be understood here as meaning in particular a change in a direction of extent in which an element, such as in particular the bearing element, extends. The bearing element can thereby be formed in a particularly advantageous manner. In particular, by means of the angular deflection, the bearing element can advantageously be moved out of a neck region of the passenger together with the region which connects the two bearing regions to each other, in the central region of the central cushion unit.

Furthermore, it is proposed that the head-support module has a blocking unit which is provided to hold the lateral cushion unit in a storage position in a certain crash situation. A "blocking unit" is intended to be understood here as meaning in particular a unit which, in at least one state, prevents at least a movement between two elements with respect to each other by arresting said elements with respect to each other. A blocking unit in this context should be understood here as meaning in particular a unit which, in a locking state, prevents a movement of the lateral cushion units with respect to the central cushion unit. A "certain crash situation" is intended to be understood here as meaning in particular a scenario in which acceleration forces act on the aircraft seat, said acceleration forces going beyond acceleration forces in a normal operating state. A certain crash situation can be understood here as meaning, for example, a reproducible crash simulation in which accelerations going beyond acceleration forces in a normal operating state are exerted on an aircraft seat for approval and test purposes. Such a crash situation is designed here for example as a 16 G test in which aircraft seats are exposed to 16 times the gravitational acceleration. As a result, the head-support module can preferably be advantageously formed safely.

Furthermore, it is proposed that the blocking unit has an active locking, which is provided to undertake locking of the at least one lateral cushion unit in a crash situation in order to avoid an undesirable movement. "Active locking" is intended to be understood here as meaning in particular locking which switches on automatically and in particular is not controlled and/or driven in response to a triggering force by a user. The blocking unit for active locking is provided here in particular to identify a certain crash situation and to thereupon automatically trigger locking. For this purpose, the blocking unit here preferably has a sensor element which automatically identifies a crash situation by recording characteristic values defining the certain crash situation. The sensor element here is preferably designed as an acceleration or inertia sensor. A characteristic value to be determined for identifying a crash situation is preferably in the form of an acceleration here. The sensor element here can be designed as an electric and/or electronic sensor which detects an acceleration characteristic value and outputs an electric and/or electronic sensor signal formed equivalently with respect thereto. The sensor element can be designed as a mechanical element, for example as an inertia element, which reacts in a defined manner when subjected to an acceleration and thereby mechanically triggers locking by releasing, for example, a movement path of a locking element. "Locking of the cushion unit" is intended to be understood here as meaning in particular preventing a movement of the at least one lateral cushion unit relative to the central cushion unit. The head-support module can thereby be particularly safely configured in a crash situation and injuries to the passenger due to the lateral cushion units can be reduced or prevented.

In addition, it is proposed that the head-support module has a bearing unit, which is provided to pivotably support the lateral cushion unit at least around a pivot axis which is arranged in a vicinity of the center plane of the central cushion unit. A "center plane of the central cushion unit" is intended to be understood here as meaning in particular a plane and is intended to be understood as meaning a plane arranged centrally between a rear side and a front side, which lies opposite the rear side and forms a support surface of the central cushion unit, of the central cushion unit, which plane divides the central cushion unit into a front half and a rear half. A "vicinity of the center plane" is intended to be understood here as meaning in particular a region of 2 cm in front of and 2 cm behind the center plane. The pivot axis is particularly advantageously arranged in the vicinity in front of the center plane, but in principle it is also conceivable for the pivot axis to lie on the center plane. It is thus advantageously possible for the pivot axis to be placed particularly advantageously and for the lateral cushion units to be pivoted particularly advantageously far forward into their use position.

It is furthermore proposed that the at least one lateral cushion unit has a height which is greater than 2 cm and preferably greater than 4 cm. "Greater than 2 cm" is intended to be understood here as meaning in particular greater than 2 cm, preferably greater than 5 cm and, in a particularly advantageous refinement, 10 cm. As a result, the lateral cushion unit can be formed particularly advantageously.

In addition, it is proposed that the at least one lateral cushion unit has a length which is greater than 5 cm and preferably than 7 cm. An "aircraft seat device" is intended to be understood here as meaning in particular greater than 5 cm, preferably greater than 10 cm and, in a particularly advantageous refinement, 15 cm. A length of the lateral cushion unit in a use position of the lateral cushion unit is measured here from an established contact surface of the central cushion unit as far as a front end of the lateral cushion unit, said front end facing away from the central cushion unit. As a result, the lateral cushion unit can be formed particularly advantageously.

Furthermore, it is proposed that the at least one lateral cushion unit is provided to be moved out of a hazardous region in a crash situation. A "hazardous region" is intended to be understood here as meaning in particular a region in which a lateral cushion unit, when arranged rigidly in the region, would constitute a hazard for a passenger. In a crash situation, the hazardous region is defined in particular as the region in which the lateral cushion unit is arranged in its use position in a normal operating state. The head-support module can thereby be formed particularly safely since a passenger in a crash situation cannot strike against lateral cushion elements arranged in their use position.

In addition, it is proposed that the at least one lateral cushion unit is of such flexible design and/or has such a corresponding shape that, in a crash situation, the cushion unit are provided to be moved out of the hazardous region by a passenger crashing thereagainst. "Formed flexibly such" is intended to be understood in this connection here as meaning in particular that, in the event of an impact force which is greater than a defined limit force from which striking thereagainst would be hazardous to the health of a passenger, the lateral cushion element is deformable plastically and/or elastically and is pushed out of the hazardous region by the body part striking the cushion element. However, the lateral cushion element here is of such rigid design that forces during normal operation, for example because of a passenger's head or neck resting and/or being supported thereon, can be absorbed without the lateral cushion element being plastically deformed. A "corresponding shape" is intended to be understood here as meaning in particular a shape which assists plastic deformation of the lateral cushion element in the case of an impact force which is greater than a defined limit force from which striking thereagainst would be hazardous to the health of a passenger or which provides an impact surface for the passenger, which impact surface is advantageous and is not hazardous to health, for example no pointed edges are directed toward the passenger. The effect which can advantageously be achieved by this is that a passenger cannot be injured on the head-supporting module in a crash situation.

Furthermore, it is proposed that the at least one lateral cushion unit has at least one frictional blocking unit, by means of which the cushion unit can be frictionally arrested, at least substantially, in a positionally fixed manner in different angular positions. A "frictional blocking unit" is intended to be understood here as meaning in particular a unit which, by means of a frictional lock, frictionally arrests two mutually movable elements with respect to each other preferably steplessly in different positions, in particular angular positions.

The at least one cushion unit can thereby be arranged particularly advantageously by a passenger in a positionally fixed manner in different positions.

Furthermore, it is proposed that the frictional blocking unit has a freewheel, by means of which the at least one lateral cushion unit can be pivoted at least out of a storage position by at least 5 degrees, preferably 10 degrees, without a counter momentum. A "freewheel" is intended to be understood as meaning in particular a region, preferably an angular region, about which the frictional blocking unit can be pivoted without a counter momentum being generated by it. In the freewheel, those elements of the frictional blocking unit that generate a frictional momentum are preferably not in contact here. As a result, the at least one cushion unit can be moved particularly advantageously out of its storage position initially without a counter momentum.

The seat device according to the invention is not intended to be restricted here to the above-described use and embodiment. In particular, the seat device according to the invention for carrying out a manner of operation described herein can have a number of individual elements, components and units differing from a number mentioned herein.

DRAWINGS

Further advantages emerge from the description below of the drawing. An exemplary embodiment of the invention is illustrated in the drawing. The drawing, the description and the claims contain numerous features in combination. A person skilled in the art will expediently also consider the features individually and combine them into meaningful further combinations.

Figure 2:
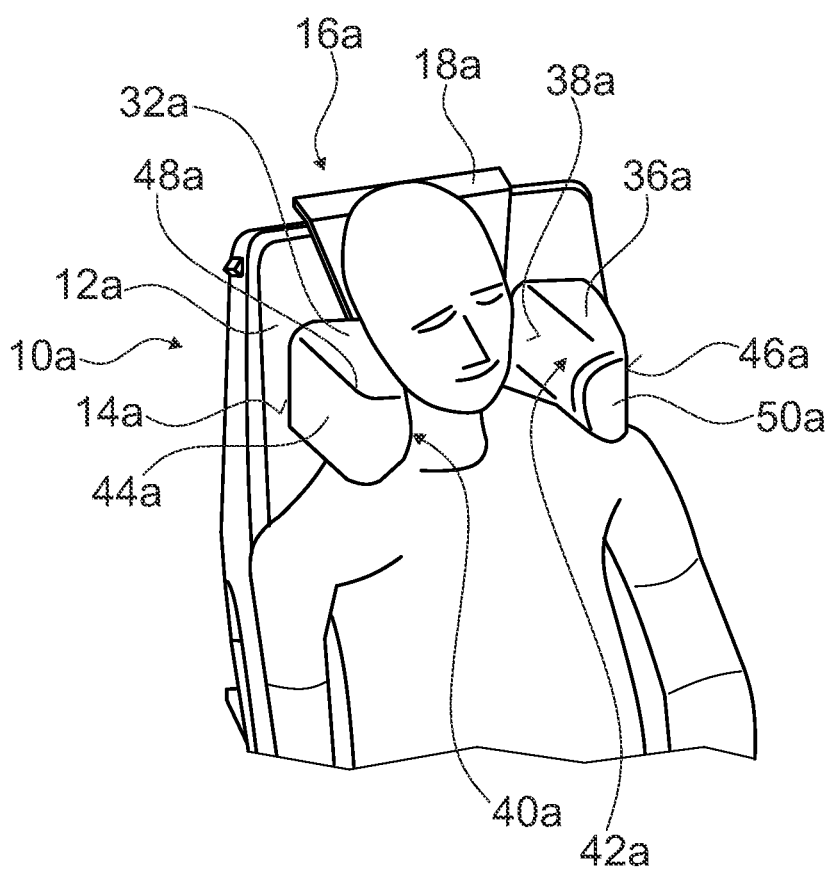
Figure 3:
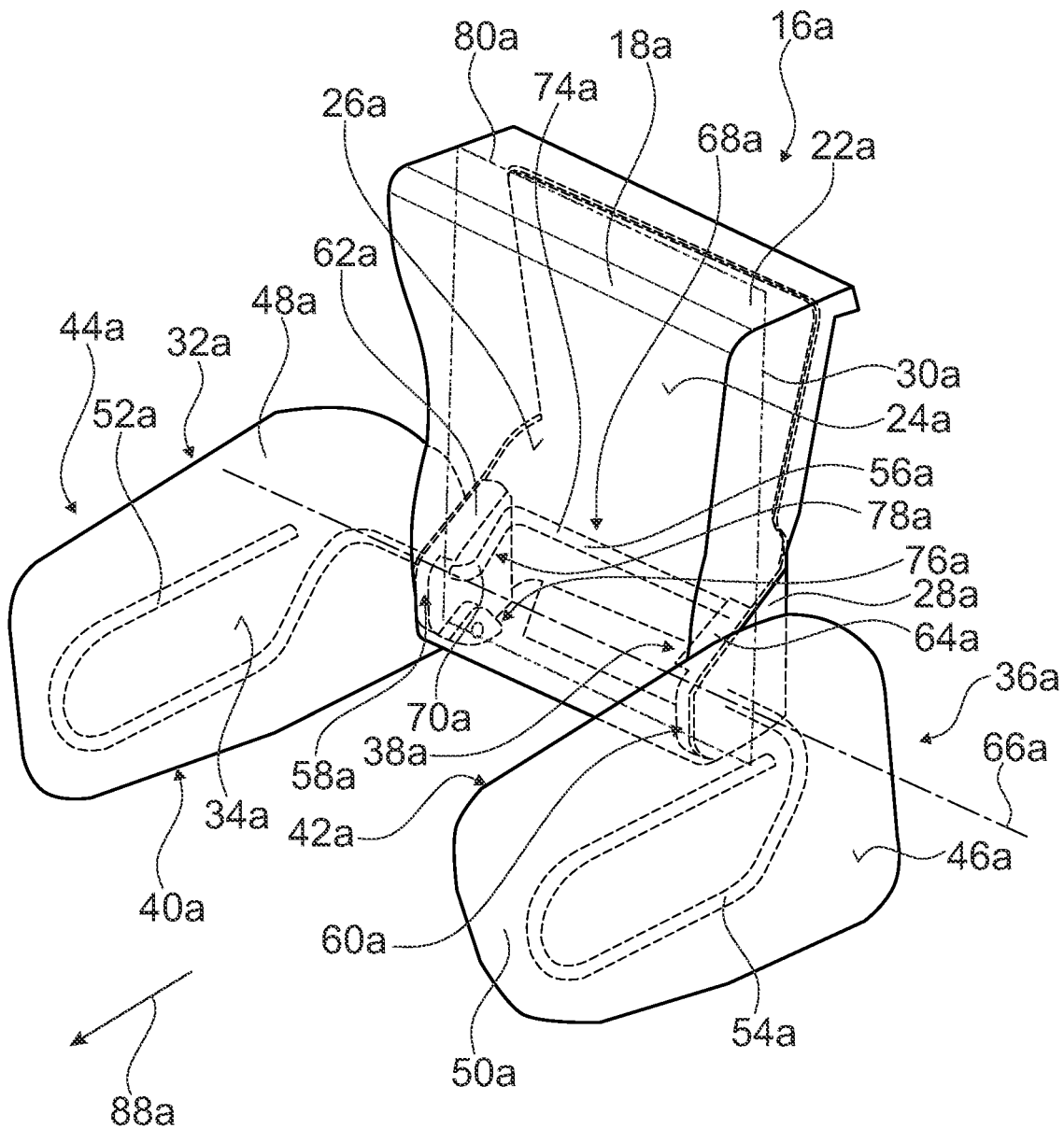
Figure 4:
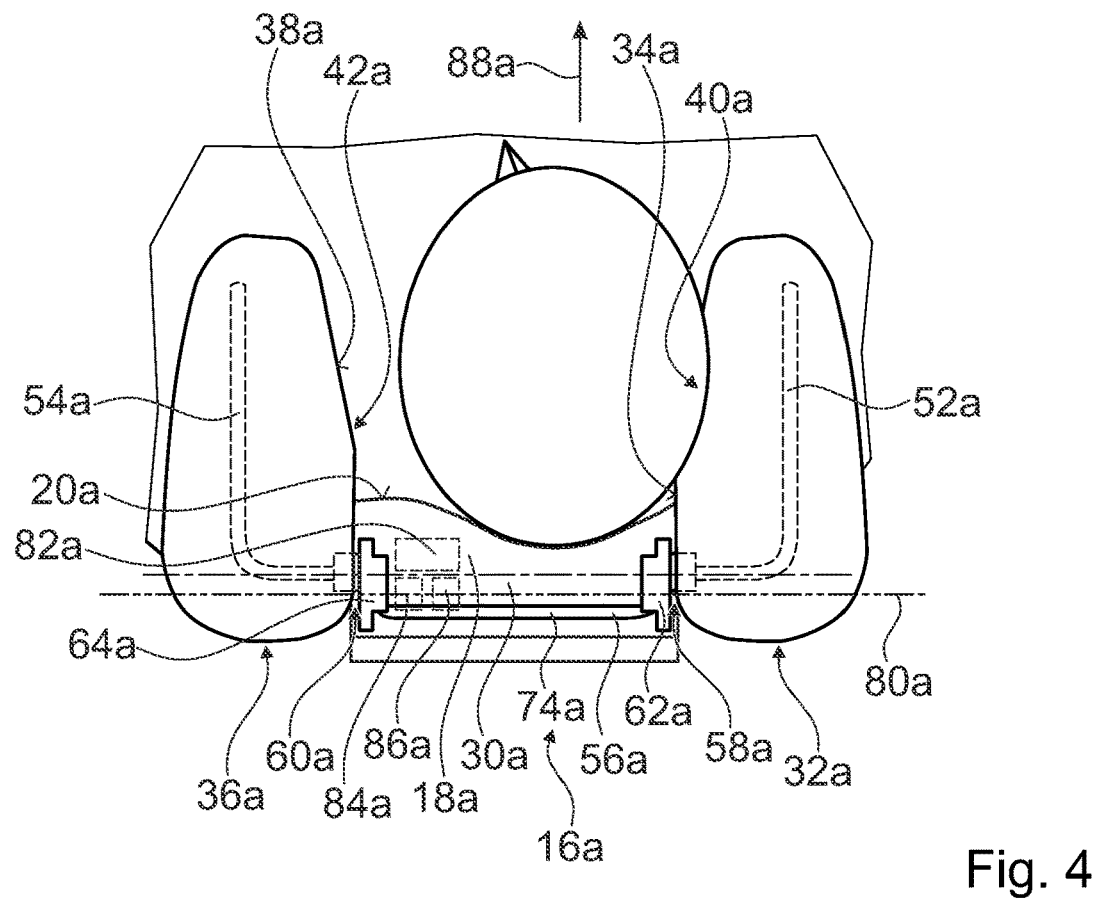
Figure 5:
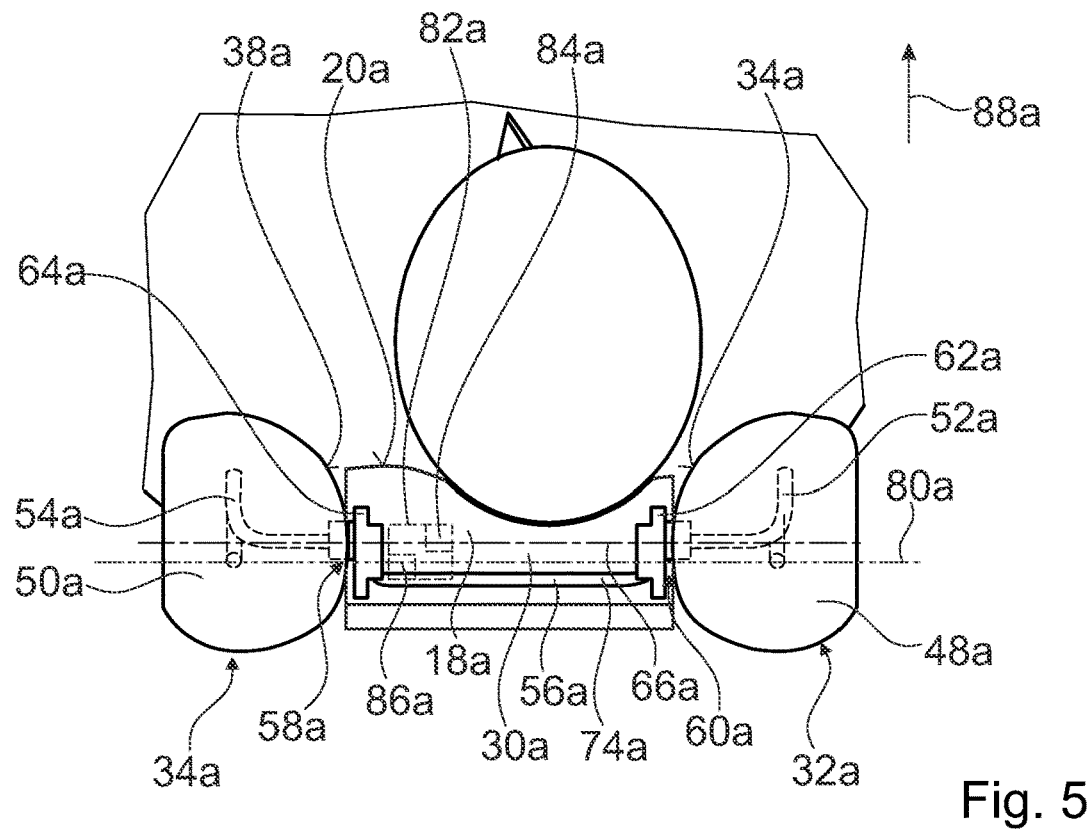
Figure 6:
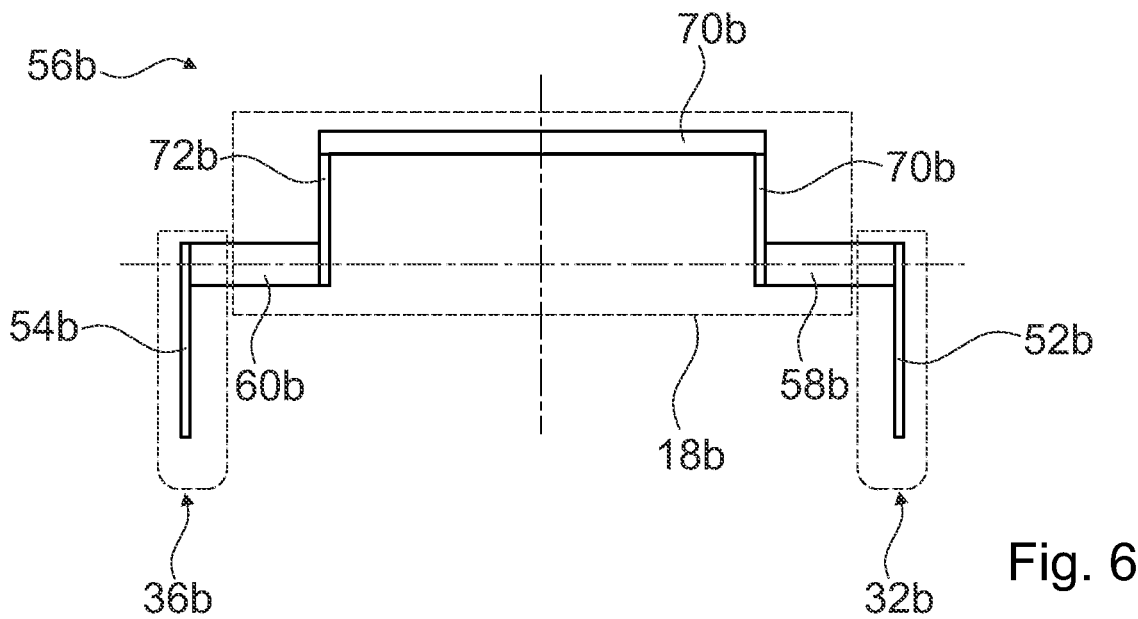
Figure 7:
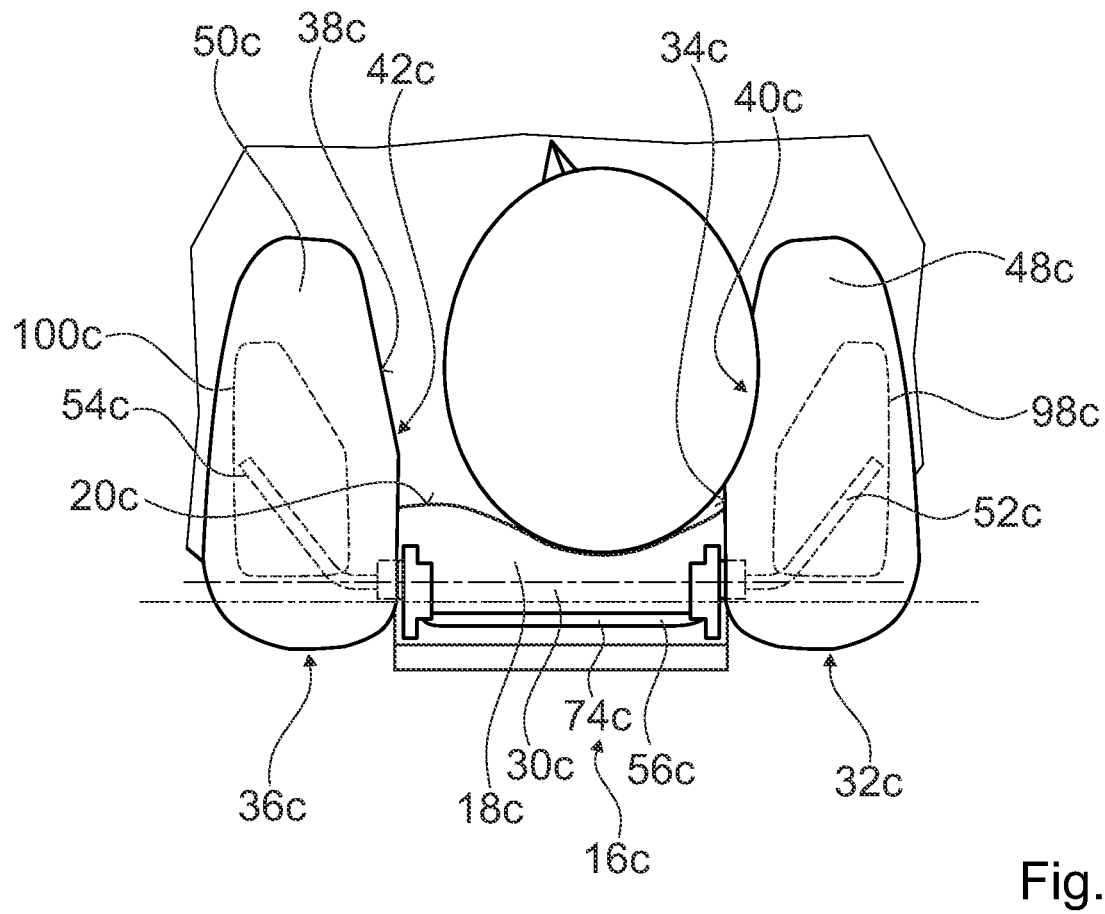
Figure 8:
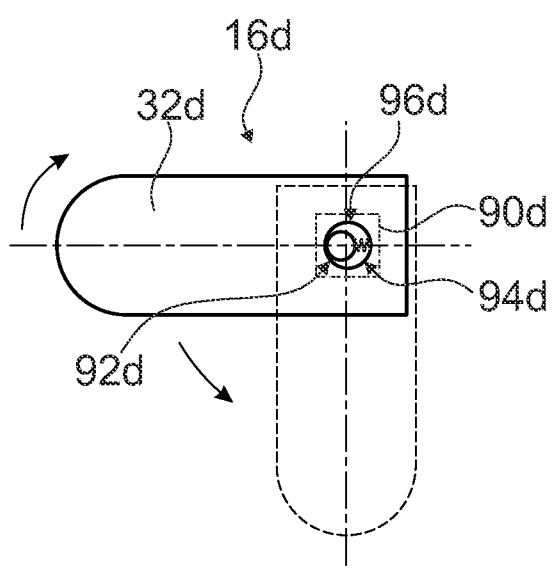
Figure 9:
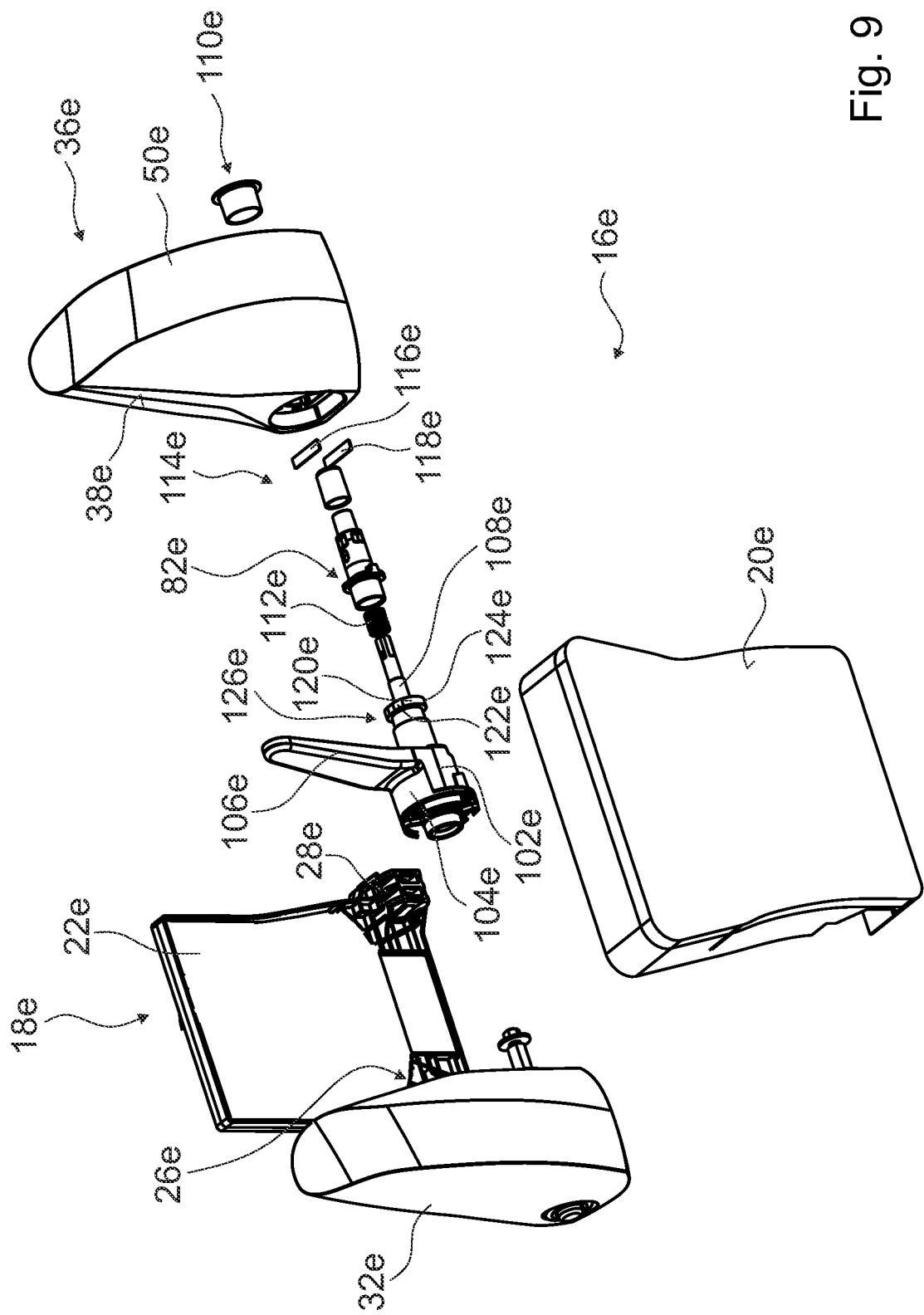
Figure 10:
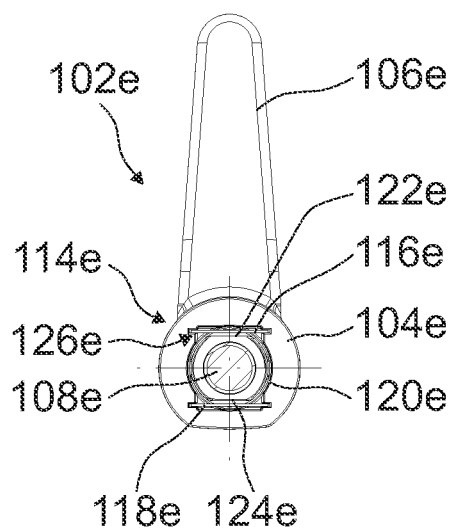
Figure 11:
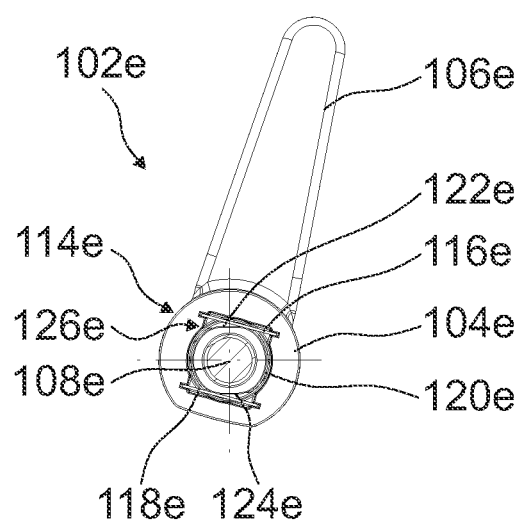
Figure 12:
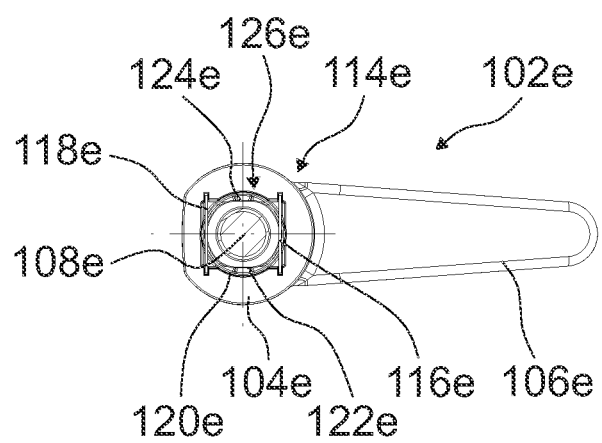

In the drawing:

FIG. 1 shows a schematic view of a seat device according to the invention with a head-support module with two lateral cushion units in their storage position and with a passenger, FIG. 2 shows a schematic view of the seat device with the head-support module with its two lateral cushion units in their use position and with a passenger, FIG. 3 shows a schematic view of the head-support module with its two lateral cushion units in its use position, FIG. 4 shows a schematic view from above of the head-support module with its two lateral cushion units in its use position, FIG. 5 shows a schematic view from above of the head-support module with its two lateral cushion units in its storage position, FIG. 6 shows a schematic view of a bearing element of a head-support module in a second exemplary embodiment, FIG. 7 shows a greatly schematized illustration of a head-support module in a third exemplary embodiment, FIG. 8 shows a highly schematized side view of a head-support module in a fourth exemplary embodiment, FIG. 9 shows a partial exploded illustration of a head-support module in a fifth exemplary embodiment, FIG. 10 shows a sectional view through a carrier element of a lateral cushion element and of a frictional blocking unit in a storage position of the cushion unit, FIG. 11 shows a sectional view through the carrier element of the lateral cushion element and of the frictional blocking unit in a pivoted position at the end of a freewheel, and FIG. 12 shows a sectional view through the carrier element of the lateral cushion element and of the frictional blocking unit in a further position.

DESCRIPTION OF THE EXEMPLARY EMBODIMENTS

FIGS. 1 to 5 show a first exemplary embodiment of a seat device according to the invention. The seat device is designed as an aircraft seat device. The seat device designed as an aircraft seat device is part of a partially illustrated aircraft seat 10a. The aircraft seat 10a can be designed here as a seat of an aircraft seat row or as an individual seat. The aircraft seat 10a is provided to be mounted on a cabin floor, not illustrated specifically, of an aircraft, not illustrated specifically. The aircraft seat 10a has a mounting unit which is not illustrated specifically here and via which the aircraft seat 10a is mounted on the cabin floor of the aircraft seat. The aircraft seat 10a comprises a backrest 12a. The backrest 12a is coupled to the mounting unit. It is conceivable here both for the backrest 12a to be rigid or movable and to be coupled to the mounting unit so as to be arrestable in different positions. The backrest 12a forms a backrest surface 14a. The backrest surface 14a is provided in order for a passenger sitting on the aircraft seat to be able to support his/her back on the backrest surface 14a of the backrest 12a.

The seat device comprises a head-support module 16a. The head-support module 16a is provided in order for a passenger sitting on the aircraft seat 10a to be able to support at least his/her head and/or neck. The head-support module 16a is attached to the backrest 12a. The head-support module 16a is arranged on a front side of the backrest 12a, on which side the backrest 12a forms its backrest surface 14a. The head-support module 16a is connected adjustably to the backrest 12a. The head-support module 16a can be adjusted relative to the backrest 12a. The head-support module 16a displaceable in height relative to the backrest 12a. The seat device has a linear bearing unit via which the head-support module 16a is mounted with respect to the backrest 12a. The linear bearing unit has a guide rail, not illustrated specifically, which is connected to the backrest and in which a guide element, not illustrated specifically, which is connected to the head-support module 16a is mounted displaceably. The guide rail forms a guide track which is oriented substantially parallel to a main direction of extent of the backrest 12a. The head-support module 16a can thereby be advantageously set by a passenger to his/her desired height. In principle, it is also conceivable for the linear bearing unit to have a plurality of guide rails and corresponding guide elements in order to achieve a more advantageous mounting of the head-support module 16a. The seat device has a blocking unit, not illustrated specifically, by means of which the head-support module 16a can be arrested in the linear bearing unit with respect to the backrest 12a. The head-support module 16a can be adjusted and arrested infinitely variably in height with respect to the backrest 12a via the linear bearing unit and the blocking unit.

The head-support module 16a has a central cushion unit 18a. The central cushion unit 18a forms a support surface 20a. The support surface 20a is provided in order for a passenger to be able to support the back of his/her head thereon. The support surface 20a of the central cushion unit 18a is formed substantially parallel to the backrest surface 14a of the backrest 12a. It is conceivable here for the support surface 20a of the central cushion unit 18a to be at an angle at least in partial regions with respect to the backrest surface 14a of the backrest 12a. The central cushion unit 18a has a carrier element 22a. The carrier element 22a is designed as a thin plate. The carrier element 22a is designed as a sheet metal element. In principle, it is also conceivable for the carrier element 22a to be formed as an injection molded component made of a plastic, which has, for example, integrated bearing points. The carrier element 22a forms a flat main region 24a. The main region here is substantially in the shape of the central cushion unit 18a. In the main region 24a, the carrier element 22a forms a receiving region in which the guide element of the linear bearing unit is connected for adjusting the head-support module 16a. The head-support module 16a is coupled to the backrest 12a via the central cushion unit 18a. The head-support module 16a is coupled to the backrest 12a via the carrier element 22a. In a lower region, the carrier element 22a forms two side elements 26a, 28a which are angled perpendicularly to the main region 24a. The side regions 26a, 28a are each arranged on opposite sides in the lower region of the carrier element 22a. The side regions 26a, 28a extend away forward from the main region. The side regions 26a, 28a are designed here as connection regions. The central cushion unit 18a comprises a comfort element 30a which surrounds the carrier element 22a. The comfort element 30a forms the support surface 20a. The support surface 20a which is formed by the comfort element 30a can be formed flat here or can have a contour. In particular, it is conceivable for the comfort element 30a to be thicker in a lower region and thus to form a bulge in the support surface 20a in the lower region. The comfort element 30a is formed from a foam. The comfort element 30a encases the carrier element 22a at least on the front side thereof. In a mounted state, the comfort element 30a is covered by a protective cover which is not illustrated specifically here, protects the comfort element from soiling and is interchangeable in a simple manner.

The head-support module 16a comprises a first lateral cushion unit 32a. The first lateral cushion unit 32a is arranged on a right side of the central cushion unit 18a. The first lateral cushion unit 32a is provided to provide a lateral support surface 34a for a passenger. The lateral support surface 34a of the lateral cushion unit 32a is provided in order for a passenger to be able to support his/her lateral head region and/or his/her neck. The head-support module comprises a second lateral cushion unit 36a. The second lateral cushion unit 36a is arranged on a left side of the central cushion unit 18a. The second lateral cushion unit 36a is provided to provide a lateral support surface 38a for a passenger. The lateral support surface 38a of the lateral cushion unit 32a is provided in order for a passenger to be able to support his/her lateral head region and/or his/her neck. The second lateral cushion unit 36a is arranged on a side of the central cushion unit 18a lying opposite the first lateral cushion unit 32a. The support surface 34a of the first lateral cushion unit 32a lies opposite the support surface 38a of the second cushion unit 36a. The support surface 34a of the first lateral cushion unit 32a faces the support surface 38a of the second cushion unit 36a. The two lateral cushion units 32a, 36a are of substantially identical design. The two lateral cushion units 32a, 36a are formed mirror-symmetrically with respect to each other. The two lateral cushion units 32a, 36a are essentially of identical design and are identically connected to the central cushion unit 18a.

The lateral cushion units 32a, 36a are of substantially cuboidal design. The lateral cushion units 32a, 36a here have rounded edges. It is in principle also conceivable for at least one side surface of the lateral cushion units 32a, 36a to be of trapezoidal design. The lateral cushion units 32a, 36a here converge in a slightly pointed manner at a front end. At a rear end, the lateral cushion units 32a, 36a have a width which is greater than at the front end. The lateral cushion units 32a, 36a have a length (L) of 10 m. The length (L) of the lateral cushion units 32a, 36a is measured here from the rear end as far as the front end. The lateral cushion units 32a, 36a have a height (H) of 8 cm. The height (H) of the lateral cushion units 32a, 36a is measured here from a lower side as far as an upper side of the lateral cushion units 32a, 36a. An inner side 40a, 42a of the lateral cushion units 32a, 36a, which inner side faces the central cushion unit 18a in the mounted state, forms the support surface 34a, 38a of the corresponding lateral cushion unit 32a, 36a. The inner sides 40a, 42a are of curved design here. The inner sides 40a, 42a are curved nonuniformly. The inner sides 40a, 42a of the lateral cushion units 32a, 36a have a greater radius here in the direction of the lower side than in the direction of the upper side. A particularly advantageously ergonomic support surface 34a, 38a can thereby be achieved. An outer side 44a, 46a of the lateral cushion units 32a, 36a, said outer side facing away from the central cushion unit 18a in the mounted state, in each case form a lateral closure surface of the lateral cushion units 32a, 36a. The outer sides 44a, 46a are of substantially flat design here.

The lateral cushion units 32a, 36a each comprise a comfort element 48a, 50a. The comfort elements 48a, 50a each form the support surfaces 34a, 38a of the lateral cushion units 32a, 36a. The support surfaces 34a, 38a which are formed by the comfort elements 48a, 50a have a contour here, as described above. In principle, however, it is also conceivable for the support surfaces 34a, 38a which are formed by the comfort elements 48a, 50a to be of flat design. The comfort elements 48a, 50a are formed from a foam. In a mounted state, the comfort elements 48a, 50a are each covered by a protective cover which is not illustrated specifically here, protects the comfort elements 48a, 50a from soiling and are interchangeable in a simple manner. The lateral cushion units 32a, 36a each have a carrier element 52a, 54a. The comfort elements 48a, 50a are each arranged around the corresponding carrier element 52a, 54a. The carrier elements 52a, 54a support the respective comfort element 48a, 50a of the corresponding lateral cushion unit. The comfort elements 48a, 50a are connected here to the carrier element 52a, 54a in a form-fitting manner. In principle, it is also conceivable for the comfort elements 48a, 50a to be fixedly connected to the respective carrier element 52a, 54a in an integrally bonded manner, for example via an adhesive connection. The comfort elements 48a, 50a completely surround the carrier elements 52a, 54a.

The lateral cushion unit 32a is supported movably relative to the central cushion unit 18a. The lateral cushion unit 32a is adjustable relative to the central cushion unit 18a between a storage position and a use position. The lateral cushion unit 32a is mounted rotatably with respect to the central cushion unit 18a. The lateral cushion unit 32a is pivotable between its storage position and its use position. The second lateral cushion unit 36a is likewise supported movably relative to the central cushion unit 18a. The lateral cushion unit 36a is adjustable relative to the central cushion unit 18a between a storage position and a use position. The lateral cushion unit 36a is mounted rotatably with respect to the central cushion unit 18a. The lateral cushion unit 36a is pivotable between its storage position and its use position. In their storage positions, the lateral cushion units 32a, 36a are each arranged on the central cushion unit 18a in such a manner that their lateral support surfaces 34a, 38a are arranged on a side surface of the central cushion unit 18a. In their storage positions, a passenger sitting on the aircraft seat 10a cannot support his/her lateral head or neck region on the support surfaces 34a, 36a of the lateral cushion units 32a, 36a. In their storage positions, the lateral cushion units 32a, 36a are in each case not useable in a designated manner by a passenger for supporting a neck region. In the storage position, lower sides of the lateral cushion units 32a, 36a face a passenger and are oriented substantially parallel to the support surface 20 of the central cushion unit 18. In their storage position, the lateral cushion units 32a, 36a use their lower sides to widen the support surface 20 of the central cushion unit 18. As a result, in the storage position of the lateral cushion units, a particularly advantageously wide head-support surface can be provided. In their storage positions, the lateral cushion units 32a, 36a are each brought into an overlap with the central cushion unit 18a. The two lateral cushion units 32a, 36a are jointly adjustable between their storage positions and use positions. The two lateral cushion units 32a, 36a are coupled to each other in one adjustment. If the one lateral cushion unit 32a, 36a is adjusted, the other lateral cushion unit 32a, 36a is automatically adjusted at the same time. In principle, it would also be conceivable for the two lateral cushion units 32a, 36a to be adjustable independently of each other.

The head-support module 16a has a bearing element 56a. The bearing element 56a is provided for a support of the first lateral cushion unit 32a. The bearing element 56a is provided for a support of the second lateral cushion unit 36a. The two lateral cushion units 32a, 36a are mounted pivotably with respect to the central cushion unit 18a by means of the bearing element 56a. The bearing element 56a is arranged in a lower region of the central cushion unit 18a. The bearing element 56a is arranged in particular in a lower quarter of the central cushion unit 18a. The bearing element 56a extends through the central cushion unit 18a. The bearing element 56a has two bearing regions 58a, 60a. The bearing regions 58a, 60a are arranged in side regions of the central cushion unit 18a. The bearing element 56a is coupled with its bearing regions in particular to the side regions 26a, 28a of the carrier element 22a of the central cushion unit 18a. The side regions 26a, 28a of the carrier element 22a of the central cushion unit 18a are provided with through holes through which the bearing element 56a is guided with its bearing regions 58a, 60a. The central cushion unit 18a has two bearing accommodations 62a, 64a which are provided for the partial formation of a bearing surface for the bearing regions 58a, 60a. The bearing accommodations 62a, 64a are designed as flat elements which are each attached to a side region 26a, 28a of the carrier element 22a of the central cushion unit 18a. The bearing accommodations 62a, 64a are arranged fixedly on inwardly directed inner sides of the side regions 26a, 28a of the carrier element 22a of the central cushion unit 18a. The bearing accommodations 62a, 64a each have a through hole which, in a state mounted on the side regions 26a, 28a of the carrier element 22a, are oriented coaxially with respect to the through holes in the side regions 26a, 28a. The through holes in the bearing accommodations 62a, 64a form the bearing surfaces for the bearing regions 58a, 60a of the bearing element 56a. The bearing element 56a is guided with its bearing regions 58a, 60a through the through holes of the bearing accommodations 62a, 64 and the through holes in the side regions 26a, 28a. The bearing regions 58a, 60a of the bearing element 56a are arranged coaxially with respect to each other. The bearing regions 58a, 60a of the bearing element 56a form a pivot axis 66a about which the bearing element 56a is mounted rotatably. The two lateral cushion units 32a, 36a are mounted pivotably with respect to the central cushion unit 18a about the pivot axis 66a which is formed by the bearing regions 58a, 60a. The pivot axis 66a about which the lateral cushion units 32a, 36a are mounted pivotably runs horizontally. In a mounted state of the cushion module 16a, the pivot axis 66a runs parallel to a transverse direction of the aircraft seat 10a.

The bearing element 56a emerges in each case from the central cushion unit 18a to the side of the bearing accommodations 62a, 62a or of the side regions 26a, 28a. The bearing element 56a extends in each case to the side of the central cushion unit 18a into the lateral cushion units 32a, 36a. The lateral cushion units 32a, 36a are at least partially arranged on the bearing element 56a. The bearing element 56a forms the carrier elements 52a, 54a of the lateral cushion units 32a, 36a. The carrier elements 52a, 54a of the lateral cushion units 32a, 36a are formed integrally with the bearing element 56a.

The bearing element 56a has an angular deflection 58a in a vicinity of its bearing regions 58a, 60a. The bearing element 56a forms the angular deflection 68a between the two bearing regions 58a, 60a. The angular deflection 58a is formed by the bearing element 56a directly downstream of a bearing region 58a, 60a. In a mounted state, the bearing element 56a in each case immediately has a bend on inner sides of the bearing accommodations 62a, 64a. The bearing element 56a is deflected by 90 degrees in the bends. In principle, it is also conceivable for the bearing element 56a to be deflected the bends by a different angle which preferably lies within a range of 60 to 120 degrees. Partial transition regions 70a, 72a directly downstream of the bend run parallel to the side regions 26a, 28a of the carrier element 22a in the mounted state. The two transition regions 70a, 72a are of identical length. The two transition regions 70a, 72a merge by means of a further bend on a sides facing away from the bearing regions 58a, 60a into a central region 74a. The central region 74a connects the two bearing regions 56a, 58a of the bearing element 56a. The central region 74a is formed parallel to the pivot axis 66a. The central region 74a has a distance of 2 cm from the pivot axis 66a. In principle, it is also conceivable for the central region to have a different distance from the pivot axis 66a, said distance lying in particular within a range of 0 cm to 2 cm.

The central cushion unit 18a has a center plane 80a. The center plane 80a is designed a plane which arranged in a center of the central cushion unit 18a between a front side which forms the support surface 20a and the rear side of the central cushion unit 18a. For this purpose, the center plane 80a runs substantially parallel to the rear side of the central cushion unit 18a. The center plane 80a separates the central cushion unit 18a in the sitting direction hypothetically into a front half and into a rear half. The pivot axis is arranged in front of the center plane 80a of the central cushion unit 10a in the sitting direction of the seat device.

In order to limit a pivoting movement of the lateral cushion elements 32a, 36a, the head-support module 16a has stops 76a, 78a. In the storage position of the lateral cushion units 32a, 36a, the bearing element 56a lies with a partial region in each case against the stops 78a. In the and in the use position of the lateral cushion units 32a, 36a, the bearing element 56a lies with partial regions in each case against the stops 76a. The bearing element 56a lies in particular with its transition regions 70a, 72a against the stops 76a, 78a. The stops 76a, 78a are formed by the bearing accommodations 62a, 64a. Each of the bearing accommodations 62a, 64a here in each case forms the two stops for limiting a pivoting of the lateral cushion units 32a, 36a into the use position and into the storage position.

The lateral cushion units 32a, 36a are pivotable by 90 degrees about the pivot axis 66a between their storage position and their use positions. In principle, it is also conceivable for the lateral cushion units 32a, 36a to be pivotable with respect to the central cushion unit 18a by a different angle within a range of 70 to 120 degrees between their storage positions and their use positions. In principle, it is also conceivable for the head-support module 16a to have a latching device by means of which the lateral cushion units 32a, 36a can be arrested in any desired positions between the storage position and the use position. In the storage position, the lateral cushion units 32a, 36a are arranged with a front end directed toward. The lateral cushion units 32a, 36a lie with their inner sides 40a, 42a which form the respective support surface 34a, 38 against a lateral surface of the central cushion unit 18a (see FIG. 1). Lower sides of the lateral cushion units 32a, 36a are oriented substantially parallel to the support surface 20a of the central cushion unit 18a. The lower sides of the lateral cushion units 32a, 36a together with the support surface 20a of the central cushion unit 18a form a wide support surface for the back of a passenger's head. The lateral cushion units 32a, 36a lie here directly against the side surfaces of the central cushion unit 18a, wherein preferably in particular a gap is not formed between the central cushion unit 18a and the respective lateral cushion unit 32a, 36a. As a result, in the storage position of the lateral cushion units 32a, 36a, a particularly advantageously wide and comfortable supporting possibility for the back of a passenger's head can be formed by means of the head-support module 16a. In the use position, the lateral cushion units 32a, 34a are pivoted forward out of the storage position about the pivot axis 66a with a the front end. The first lateral cushion unit 32a extends forward in the sitting direction on the right side of the central cushion unit 18a in the lower region of the cushion unit 18a. The second lateral cushion unit 36a extends forward in the sitting direction on the right side of the central cushion unit 18a in the lower region of the cushion unit 18a. In the lower region of the central cushion unit 18a, the central cushion unit 18a and the lateral cushion units 32a, 36a with their support surfaces 20a, 34a, 36a substantially form a U shape. In principle, it is also conceivable for the support surfaces 34a, 36a of the lateral cushion units to have a different angle than 90 degrees with respect to the support surface 20a of the central cushion unit 18a and for the support surfaces 20a, 34a, 38a to accordingly form a V shape. In the use position, the lateral cushion units 32a 36a are extend as far as in front of a plane which is formed by the support surface 20a of the central cushion unit 18a.

The bearing element 56a is in the form of a wire-like bearing element 56a. The bearing element 56a is formed by a rod. The bearing element 56a is formed by a rod with a round cross section. The bearing element 56a has a circular cross section. The bearing element 56a is formed by a bent rod. The bearing element 56a is appropriately bent in order to form the bearing regions 58a, 60a, the angular deflection 68a and in order to form the carrier elements 52a, 54a of the lateral cushion units 32a, 36a. The bearing regions 58a, 60a, the angular deflection 68a and the carrier elements 52a, 54a of the lateral cushion units 32a, 36a are formed integrally by the bearing element 56a. In those regions of the lateral cushion units 32a, 36a in which the bearing element 56a forms the carrier elements 52a, 54a of the lateral cushion units 32a, 36a, the bearing element 56a is in each case bent in a substantially U shape. As a result, the bearing element 56a particularly advantageously forms the carrier elements 52a, 54a of the lateral cushion units 32a, 36a and the comfort elements 48a, 50a can be simply fastened fixedly on the bearing element 56a.

The head-support module 18a has a blocking unit 82a. The blocking unit 82a has active locking. The blocking unit is provided to undertake locking of the lateral cushion unit 32a, 36a by means of the active locking in a crash situation in order to avoid an undesirable movement. Locking of the lateral cushion units 32a, 36 takes place here during a certain crash situation. The blocking unit 82a is provided to hold the lateral cushion units 32a, 36a in their storage position in a certain crash situation. In particular in a scenario in which acceleration forces which act on the aircraft seat are greater than in a normal operation, the blocking unit 82a locks the lateral cushion units 32a, 36a in the storage position. The blocking unit 82a comprises a sensor element 84a which is provided to determine at least one characteristic value which can be assigned to a certain crash situation. The sensor element 84a is designed here as an acceleration sensor. The sensor element 84a is designed here as a mechanical inertia element which, in a certain crash situation, is deflected out of an inoperative position during a defined acceleration. In principle, it is also conceivable for the sensor element to be designed as an electronic acceleration sensor which outputs an electric or electronic signal which depends on an acceleration acting on the sensor element. The blocking unit 82a comprises a locking element 86a. The locking element 86a is provided to lock the lateral cushion units 32a, 36a in the storage position in a certain crash situation. The locking element 86a is provided to mechanically lock the lateral cushion units 32a, 36a in a certain crash situation identified by the sensor unit 84a. The locking element 86a is designed here as a spring-loaded element which, in a certain crash situation, is released by the sensor element 84a and to lock pivoting of the lateral cushion units 32a, 36a if the latter are to be arranged in their storage position. For the locking, the locking element 86a is provided to be brought into contact with the bearing element 56a of the head-support module 16a in order to prevent rotation of the bearing element 56a about the pivot axis 66a. In principle, it is also conceivable for the locking element 86a and the sensor element 84a to be formed at least partially integrally with each other. In principle, it is also conceivable for the blocking unit 82a to be designed in another manner.

In principle, it is also conceivable for the blocking unit 82a to be of passive design. It is conceivable in this case for the blocking unit 82a to be provided for passive arresting of the lateral cushion units 32a, 36a. The arresting of the lateral cushion units 32a, 36a is triggered here by manual actuation of an actuating element of the blocking unit 82a. The actuating element is actuatable here by a passenger himself/ herself and/or by onboard crew. The lateral cushion units 32a, 36a can thereby be optionally locked or released by means of the blocking unit. The lateral cushion units 32a, 36a is are locked here automatically in the storage position by the blocking unit 82a by means of a locking element. In order to adjust the lateral cushion units 32a, 36a from the storage position into the use position, the actuating element has to be actuated by the passenger in order to release rotation of the lateral cushion units 32a, 36a about the pivot axis 66a. In principle, it is likewise conceivable for the blocking unit 82a to be provided to automatically arrest the lateral cushion units 32a, 36a in the storage position in a TTL position of the aircraft seat. The TTL position of the aircraft seat 10a is designed here as a position of the aircraft seat 10a that is intended to be adopted for the takeoff phase, and for the landing phase and in which, for example, the backrest 12a is arranged in an upright position.

FIGS. 6 to 12 show four further exemplary embodiments of the invention. The descriptions below and the drawings are essentially limited to the differences between the exemplary embodiments, wherein with regard to identically designed components, in particular with regard to components having the same reference signs, reference can in principle also be made to the drawings and/or the description of the other exemplary embodiments, in particular FIGS. 1 to 5. To differentiate between the exemplary embodiments, the letter a is placed after the reference signs of the exemplary embodiment in FIGS. 1 to 5. In the exemplary embodiments of FIGS. 6 to 12, the letter a is replaced by the letters b to e.

FIG. 8 shows a bearing element 56b for a support of two lateral cushion units 32b, 36b with respect to a central cushion unit 18b of a head-support module 18b. The bearing element 56b has the same functions as the bearing element described in the first exemplary embodiment. The bearing element 56b is formed from a plurality of elements connected to one another. It is conceivable here for the various elements which form the bearing element to be connected to one another in an integrally bonded and/or form-fitting manner. The bearing element 56b has two bearing regions 58b, 60b. The bearing regions 58b, 60b are formed by cylindrical rods. The bearing regions 58b, 60b form a pivot axis 66b via which the lateral cushion units are mounted pivotably with respect to the central cushion unit. On their outer circumference, the bearing elements 58b, 60b formed by cylindrical rods form bearing surfaces via which the bearing regions 58b, 60b are mounted rotatably with respect to the central cushion unit 18b. The bearing element 56b has transition regions 70b, 72b which are each directly connected to a bearing region 58b, 60b. The transition regions 72b, 70b are formed by thin plates. The transition regions 70b, 72b are at a right angle to the bearing regions 58b, 60b. The bearing element 56b has a central region 74b. The central region 74b connects the two transition regions 70b, 72b to each other. The central region 74b is formed by a rod. In principle, it is also conceivable for the central region 74b to be formed by a shaped metal plate. It is in particular conceivable here for the central region 74b together with the transition regions 70b, 72b to be formed by a shaped metal plate which substantially has a U shape. The central region 74b is formed parallel to the pivot axis 66b. At the two outer ends, the bearing element 56b in each case forms a carrier element 52b, 54b of a lateral cushion unit 32b, 36b. The carrier elements 52b, 54b are designed as thin plates. The carrier elements 52b, 54b are each connected to sides of the bearing regions 58b, 60b opposite the transition regions 70b, 72b. The bearing element 56b is of mirror-symmetrical design.

FIG. 7 shows an abstracted top view of a head-support module 16c. The head-support module 16c has a central cushion unit 18c and two lateral cushion units 32c, 36c. The lateral cushion units 32c, 36c are provided to be moved out of a hazardous region in a crash situation. For this purpose, the lateral cushion elements 32c, 36c are formed flexibly such that, in a crash situation, they are deformed plastically when a passenger strikes thereagainst and thereby move out of the hazardous region. The lateral cushion units 32c, 36c likewise have a corresponding shape that they move out of a hazardous region in a crash situation when a passenger strikes against them. The cushion units 32c, 36c have carrier elements 52c, 54c. The carrier elements 52c, 54c are oriented obliquely with respect to a sitting direction of the aircraft seat. The carrier elements 52c, 54c extend here merely in a rear half of the cushion units 32c, 36c. The cushion units 32c, 36c have reinforcing foam elements 98c, 100c. The reinforcing foam elements 98c, 100c are each arranged in the interior of a cushion unit 32c, 36c. The reinforcing foam elements 98c, 100c are each coupled fixedly to a carrier element 52c, 56c of the respective cushion unit 32c, 36c. The reinforcing foam elements 98c, 100c are in each case formed from a foam material which is harder and more dimensionally stable than the foam material of comfort elements 48c, 50c of the lateral cushion units 32c, 36c. As a result, despite the short carrier elements 52c, 54c, the lateral cushion units 32c, 36c can be particularly stiff and stable. In a crash situation, the lateral cushion units 32c, 36c can bend away rearward by means of the angled carrier elements 52c, 54c without a large action of force. A force acting on the impacting head of the passenger is thereby advantageously reduced. In principle, it is also conceivable for the support surfaces 34c, 38c to likewise be oriented in an inclined manner with respect to the sitting direction. The front ends of the lateral cushion units would thereby not be directed forward rectilinearly and, in a crash situation, a passenger would not strike against the front ends of the lateral cushion units, but rather on the support surfaces 34c, 38c. As a result, in the event of an impact, a force would be exerted on the lateral cushion units 32c, 36c and on the carrier elements thereof, and therefore said cushion units and carrier elements are advantageously deformed plastically and are moved out of a hazardous region.

FIG. 8 shows a highly abstracted side view of a head-support module 16d. The head-support module 16d has a central cushion unit 18d and two lateral cushion units 32d, of which only one is illustrated. The lateral cushion units 32d are provided to be moved out of a hazardous region in a crash situation. The lateral cushion units 32d are provided to be moved actively out of a hazardous region in a certain crash situation. If, in a certain crash situation, the lateral cushion units are in their use position, the lateral cushion units are provided to be brought in the crash situation out of the use position into their storage position or into another position in which they are arranged outside the hazardous region. For the adjustment of the lateral cushion units, the head-support module 16d has a safety device 90d. The safety device 90d is provided to move the lateral cushion units actively out of the hazardous region in a certain crash situation. The safety device here has a sensor element 92d which is provided to determine at least one characteristic value which can be assigned to a certain crash situation. The sensor element 92d is designed here as an acceleration sensor. The sensor element 92d is designed here as a mechanical inertia element which, in a certain crash situation, is deflected out of an inoperative position in the event of a defined acceleration. In principle, it is also conceivable for the sensor element to be designed as an electronic acceleration sensor which outputs an electric or electronic signal which depends on an acceleration acting on the sensor element. The safety device 90d has an actuator element 94d which is provided to adjust the lateral cushion units 32d, 36d. The actuator element 94d is provided to exert a force on the lateral cushion units 32d, 36d or on the mounting of the lateral cushion units in order to adjust the lateral cushion units 32d, 36d such that the lateral cushion units 32d, 36d are moved out of the hazardous region. The actuator element is designed by way of example as a spring element which can be locked in a tensioned state by means of a barrier element 96d. In the use position of the lateral cushion units, the actuator element 94d designed as a spring element is in its tensioned state and is locked by means of the barrier element 96d. The barrier element 96d is designed here by way of example as a ball. The actuator element 94d designed as a spring element is preferably tensioned here during an adjustment of the lateral cushion units 32d from their storage position into the use position. In a crash situation, the sensor element 92d senses the crash situation and releases the actuator element. The actuator element presses the lateral cushion units into a safety position. The lateral cushion units 32d fold away downward here. In principle, it would also be conceivable for the lateral cushion units 32d to be moved back into their storage position by means of the safety device 90d in a crash situation. In principle, it would likewise be conceivable for the the actuator element 94d to be formed by a shape memory alloy, to have at least one activatable actuator or to comprise at least one pyrotechnic triggering element. Furthermore, it is conceivable for the sensor element to be designed as an electronic or electric sensor which senses an acceleration or another characteristic value typical of a crash situation and outputs a corresponding sensor signal. It is conceivable here for the safety device 90d to electrically and/or electronically trigger and carry out a movement of the lateral cushion units 32d out of a hazardous region. It is likewise conceivable for the safety device 90d to purely mechanically sense and trigger a movement of the lateral cushion units 32d out of a hazardous region.

FIGS. 9 to 12 show a fifth exemplary embodiment of an aircraft seat device according to the invention. FIG. 9 shows in particular a schematic exploded illustration of a head-support module 16e. The head-support module 16e is arranged on a front side of a backrest, not illustrated specifically here.

The head-support module 16e has a central cushion unit 18e. The central cushion unit 18e forms a support surface 20e. The central cushion unit 18e has a carrier element 22e. The carrier element 22e is designed as a plate element. The carrier element 22e is designed as a main body of the head-support module 16e. The carrier element 22e is designed as a substantially rectangular plate. The carrier element 22e is in particular formed from a plastic. The carrier element 22e is designed as an injection molded element. In principle, it is also conceivable for the carrier element 22e to be formed, for example, from a fiber composite material or from a light metal. The carrier element 22e forms a flat main region 24e. The main region 24e here is substantially in the shape of the central cushion unit 18e. The carrier element 22e forms two side elements 26e, 28e in a lower region. The side elements 26e, 28e form bearing points. The side elements 26e, 28e each extend forward from the main region 24e at a lower left and right end, respectively. The side elements 26e, 28e each extend inward from a side edge of the carrier element 22e. The side elements 26e, 28e in particular in each case form a bearing recess which is provided in order for a further element to be able to be mounted therein.

The head-support module 16e comprises a first lateral cushion unit 32e. The first lateral cushion unit 32e is arranged on a right side of the central cushion unit 18e. The first lateral cushion unit 32e is provided to provide a lateral support surface 34e for a passenger. The head-support module 16e comprises a second lateral cushion unit 36e. The second lateral cushion unit 36e is arranged on a left side of the central cushion unit 18e. The second lateral cushion unit 36e is provided to provide a lateral support surface 38e for a passenger. The second lateral cushion unit 36e is arranged on a side of the central cushion unit 18e opposite the first lateral cushion unit 32e. The support surface 34e of the first lateral cushion unit 32e lies opposite the support surface 38e of the second cushion unit 36e. The cushion units 32e, 36e are formed pivotably with respect to the central cushion unit 18e. The two cushion units 32e, 36e are arranged pivotably, in particular independently of each other, relative to the central cushion unit 18e. The lateral cushion units 32e, 36e are of substantially identical design, and therefore only the one lateral cushion unit 36e and the connection thereof to the central cushion unit will be described in more detail below. The other cushion unit 32e and the connection thereof to the central cushion unit 18e is of substantially identical design. The cushion unit 36e has a carrier element 102e. The carrier element 102e has a lower bearing region 104e and an upholstery holding region 106e. The bearing region 104e is arranged at a lower end of the carrier element 102e. The bearing region 104e forms a bearing accommodation. The bearing region 104e is of substantially conical design. The upholstery holding region 106e extends radially away from the bearing region 104e. The upholstery holding region 106e is formed converging in a tapering manner from the bearing region 104e. The carrier element 102e is connected to the central cushion unit 18e via the bearing region formed by the side element 28e. The lateral cushion unit 36e comprises a comfort element 50e. The comfort element 50e forms the support surface 38e of the lateral cushion unit 36e. The support surface 38e which is formed by the comfort element 50e has an ergonomic contour here. The comfort element 50e surrounds the carrier element 102e. The carrier element 102e forms a carrying structure for the comfort element 50e. The carrier element 102e is arranged in an interior of the comfort element 50e.

The lateral cushion unit 36e comprises a bearing bolt 108e via which the lateral cushion unit 26e is connected pivotably to the central cushion unit 18e. The carrier element 102e and the central cushion unit 18e are coupled pivotably via the bearing bolt 108e. The bearing bolt 108e is fixedly connected in the bearing accommodation formed by the side element 28e. The bearing bolt 108e is in particular connected to the side element 28e for rotation therewith. The bearing bolt 108e is at least partially arranged in the bearing region 104e of the carrier element 102e. The carrier element 102e is rotatable about the bearing bolt 108e in at least one state. The carrier element here is preferably pivotable about the bearing bolt 108e by at least 180 degrees. The head-support module 18e has one blocking unit 82e per lateral cushion unit 32e, 36e. The blocking unit 82e has active locking. The blocking unit 82e is provided to lock the cushion unit in at least two different positions. The blocking unit 82e is provided to arrest the cushion unit 36e in a rotationally fixed manner with respect to the central cushion unit 18e in at least two positions. The blocking unit 82e is provided to arrest the cushion unit 36e in a form-fitting manner in the at least two positions. The blocking unit 82e is provided in particular to arrest the cushion unit 36e in a form-fitting manner at angular distances of substantially 90 degrees. The blocking unit 82e comprises a form-fitting element which is on the cushion unit side and, during rotation of the cushion unit 82e about its axis of rotation, comes into contact in a form-fitting manner every 90 degrees with a correspondingly designed form-fitting element. In principle, it is also conceivable for the blocking unit 82e to have two or more than two form-fitting elements which are on the cushion unit side and each come in an alternating manner into contact in a form-fitting manner with a correspondingly designed form-fitting element in order to arrest the lateral cushion unit 36e in a position. The blocking unit 82e is provided to lock the cushion unit 36e in a storage position. In the storage position, the cushion unit 36e is in an upright position, wherein a front end of the cushion unit is oriented upward, in particular substantially parallel to the central cushion unit. The blocking unit 82e comprises an actuating element 110e. The actuating element 110e is designed as an actuating button. The actuating element 110e is designed in particular as a pushbutton. The actuating element 110e is arranged on an outer side surface of the cushion unit 36e. In principle, the actuating element 110e can be arranged at a different point of the cushion unit 36e. The actuating element 110e is provided to be actuated by a passenger. The actuating element 110e is provided in order, in an actuated state, to release a form-fitting connection of the blocking unit 82e. The actuating element 110e is actuatable by deflection, in particular by axial displacement, toward a holding spring 112e of the blocking unit 82e.

The lateral cushion unit 36e has a frictional blocking unit 114e. The frictional blocking unit 114e is provided to hold the cushion unit in a position in a force-fitting manner in different positions between the form-fitting arresting positions defined by the blocking unit 82e. The cushion unit 36e can be arranged in a positionally stable manner at different angular positions by means of the frictional blocking unit 114e. By means of the frictional blocking unit 114e, a passenger can position the cushion unit 36e at a desired angular position, wherein the cushion unit 36e remains here at the corresponding angular position at least up to a certain force. The frictional blocking unit 114e comprises two frictional spring elements 116e, 118e. The frictional spring elements 116e, 118e are fixedly arranged in the bearing region 104e of the carrier element 102e. The frictional spring elements 116e, 118e are designed as leaf springs. The frictional spring elements 116e, 118e are fixedly arranged in the bearing region 104e of the carrier element 102e in a manner spaced apart from each other and oriented substantially parallel to each other. The frictional blocking unit 114e comprises a frictional cylinder 120e. The frictional cylinder 120e is connected to the bearing bolt 108e for rotation therewith. The frictional cylinder 120e is provided to be in frictional contact with the frictional spring elements 116e, 118e. The frictional blocking unit 114e forms a freewheel 126e in which the cushion unit 36e can be pivoted free from a frictional force by the frictional blocking unit 114e. The frictional blocking unit 114e has a freewheel 126e of 10 degrees in which the cushion unit 36e can be pivoted out of its storage position. In the freewheel 126e, the cushion unit 36e can be pivoted free from a counter momentum. In the freewheel 126e of 10 degrees, the frictional spring elements 116e, 118e of the frictional blocking unit 114e are not in direct contact with the frictional cylinder 120e. In order to form the freewheel 126e, the frictional cylinder 120e has two opposite flattened freewheeling regions 122e, 124e. In the freewheeling regions 122e, 124e, the frictional cylinder 120e is of flattened design and thereby deviates from its circular contour in the freewheeling regions 122e, 124e. In the storage position of the cushion unit 36e, the freewheeling regions 122e, 124e are arranged congruently with the frictional spring elements 116e, 118e. The freewheeling regions 122e, 124e do not contact the frictional spring elements 116e, 118e. In the storage position of the cushion unit 36e, the freewheeling regions 122e, 124e are arranged spaced apart from the frictional spring elements 116e, 118. After rotation of the cushion unit 36e by 10 degrees out of its storage position, the frictional spring elements 116e, 118e come into frictional contact with the frictional cylinder 120e at an end of the corresponding freewheeling region 122e, 124e. As a result, after rotation by 10 degrees out of the storage position of the cushion unit 36e, frictional arresting of the cushion unit 36e by means of the frictional blocking unit 114e is possible. In principle, it is also conceivable for the freewheel 126e to form a different freewheeling angle free from a counter momentum.

REFERENCE SIGNS

10 Aircraft seat
12 Backrest
14 Backrest surface
16 Head-support module
18 Central cushion unit
20 Support surface
22 Carrier element
24 Main region
26 Side region
28 Side regions
30 Comfort element
32 Lateral cushion unit
34 Support surface
36 Lateral cushion unit
38 Support surface
40 Inner side
42 Inner side
44 Outer side
46 Outer side
48 Comfort element
50 Comfort element
52 Carrier element
54 Carrier element
56 Bearing element
58 Bearing region
60 Bearing region
62 Bearing accommodation
64 Bearing accommodation
66 Pivot axis
68 Angular deflection
70 Transition region
72 Transition region
74 Central region
76 Stop
78 Stop
80 Center plane
82 Blocking unit
84 Sensor element
86 Locking element
88 Sitting direction
90 Safety device
92 Sensor element
94 Actuator element
96 Barrier element
98 Reinforcing foam element
100 Reinforcing foam element
102 Carrier element
104 Bearing region
106 Upholstery holding region
108 Bearing bolt
110 Actuating element
112 Holding spring
114 Frictional blocking unit
116 Frictional spring element
118 Frictional spring element
120 Frictional cylinder
122 Freewheeling region
124 Freewheeling region
126 Freewheel

The invention claimed is:

1. An aircraft seat device, comprising
at least one head-support module, having a central cushion unit and at least one lateral cushion unit,
wherein the at least one lateral cushion unit is supported movably relative to the central cushion unit,
wherein the at least one head-support module has one blocking unit per lateral cushion unit, each blocking unit being provided to lock the at least one lateral cushion unit in at least two different positions,
wherein the at least one lateral cushion unit has a frictional blocking unit, and
wherein the frictional blocking unit is provided to hold the at least one lateral cushion unit in a force-fitting manner in different positions between form-fitting arresting positions defined by the blocking unit.

2. The aircraft seat device as claimed in claim 1, wherein the frictional blocking unit comprises two frictional spring elements and a frictional cylinder, which is provided to be in frictional contact with the frictional spring elements.

3. The aircraft seat device as claimed in claim 1, wherein the head-support module has at least one bearing element for a support of the at least one lateral cushion unit, the at least one bearing element forming a pivot axis which runs substantially in a transverse direction of the central cushion unit.

4. The aircraft seat device as claimed in claim 3, wherein the at least one bearing element has at least one angular deflection in a vicinity of its bearing region.

5. The aircraft seat device as claimed in claim 1, wherein a bearing element extends through the central cushion unit, and comprises a second lateral cushion unit which is likewise at least partially arranged on the bearing element on a side of the central cushion unit that is situated opposite the first lateral cushion unit.

6. The aircraft seat device as claimed in claim 1, wherein the blocking unit is provided to hold the at least one lateral cushion unit in a storage position in a certain crash situation.

7. The aircraft seat device as claimed in claim 6, wherein the blocking unit has an active locking, which is provided to undertake a locking of the at least one lateral cushion unit in a crash situation in order to avoid an undesirable movement.

8. The aircraft seat device as claimed in claim 1, wherein the head-support module has a bearing unit, which is provided to pivotably support the at least one lateral cushion unit at least around a pivot axis which is arranged in a sitting direction downstream of a center plane of the central cushion unit.

9. The aircraft seat device as claimed in claim 1, wherein the at least one lateral cushion unit has a height which is greater than 2 cm.

10. The aircraft seat device as claimed in claim 1, wherein the at least one lateral cushion unit has a length which is greater than 5 cm.

11. The aircraft seat device as claimed in claim 1, wherein the at least one lateral cushion unit is provided to be moved out of a hazardous region in a crash situation.

12. The aircraft seat device as claimed in claim 1,
wherein the at least one lateral cushion unit is of such flexible design and/or has such a corresponding shape that, in a crash situation, the at least one lateral cushion unit is provided to be moved out of the hazardous region by a passenger crashing thereagainst.

13. The aircraft seat device as claimed in claim 1,
wherein by means of the frictional blocking unit the at least one cushion unit can be arrested, at least substantially, in a positionally fixed, friction-fit manner in different angular positions.

14. The aircraft seat device as claimed in claim 13,
wherein the frictional blocking unit has a freewheel by means of which the at least one lateral cushion unit can be pivoted at least out of a storage position by at least 5 degrees without a counter momentum.

15. An aircraft seat, with an aircraft seat device as claimed in claim 1.

16. The aircraft seat device as claimed in claim 1,
wherein the frictional locking unit is provided to frictionally arrest the at least one lateral cushion unit steplessly in different positions.

17. The aircraft seat device as claimed in claim 2,
wherein the frictional cylinder has two opposite flattened freewheeling regions in which the frictional cylinder is of flattened design and thereby deviates from its circular contour in the freewheeling regions, to form a freewheel.

* * * * *